United States Patent [19]

Carroll et al.

[11] Patent Number: 4,875,166
[45] Date of Patent: Oct. 17, 1989

[54] BANDWIDTH ENHANCING SEISMIC ACQUISITION SYSTEM AND METHOD

[75] Inventors: Paul E. Carroll; Roy W. James, III, both of Houston; Charles K. Bowen, Richmond; Gillan C. Smith, Houston, all of Tex.

[73] Assignee: Input/Output, Inc., Stafford, Tex.

[21] Appl. No.: 107,500

[22] Filed: Oct. 9, 1987

[51] Int. Cl.$^4$ .................................................. G06C 7/48
[52] U.S. Cl. ........................................ 364/421; 367/44
[58] Field of Search ................. 364/420, 421, 724; 367/43, 44

[56] References Cited

U.S. PATENT DOCUMENTS 4,277,834  7/1981  Garibotto ........................... 367/43
4,321,675  3/1982  Harris et al. ....................... 367/43

Primary Examiner—A. D. Pellinen
Assistant Examiner—Jeffrey A. Gaffin
Attorney, Agent, or Firm—Dodge, Bush & Moseley

[57] ABSTRACT

A low-cut filter is provided which has a frequency response with its low frequency end attenuation limited. The low-cut filter has the effect of increasing effective channel bandwidth while simultaneously allowing low frequency signals from deep within the earth to be included in the output signal. Effective channel bandwidth is increased because low frequency seismic signals are attenuated, automatically allowing channel gain to be increased by a gain ranging amplifier. Increased channel gain automatically amplified the low-amplitude high-frequency end of the spectrum resulting in increased effective bandwidth. A high frequency boost filter is provided whereby the high frequency signal components of the seismic signals may be further relatively amplified thereby enhancing the channel effective bandwidth. The boost filter is provided in the system's input stage in order to keep its effect on system input noise to a minimum.

20 Claims, 9 Drawing Sheets

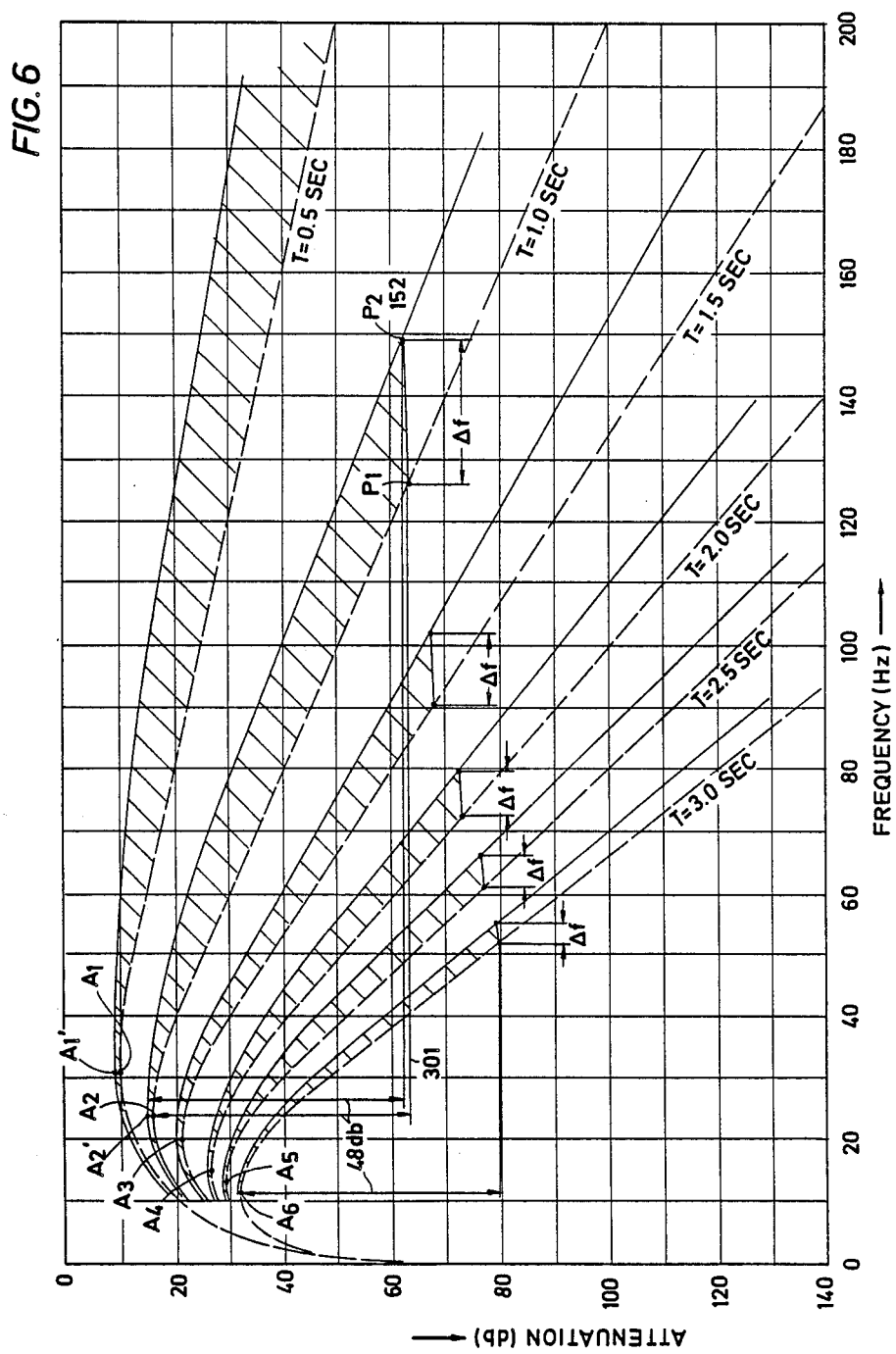

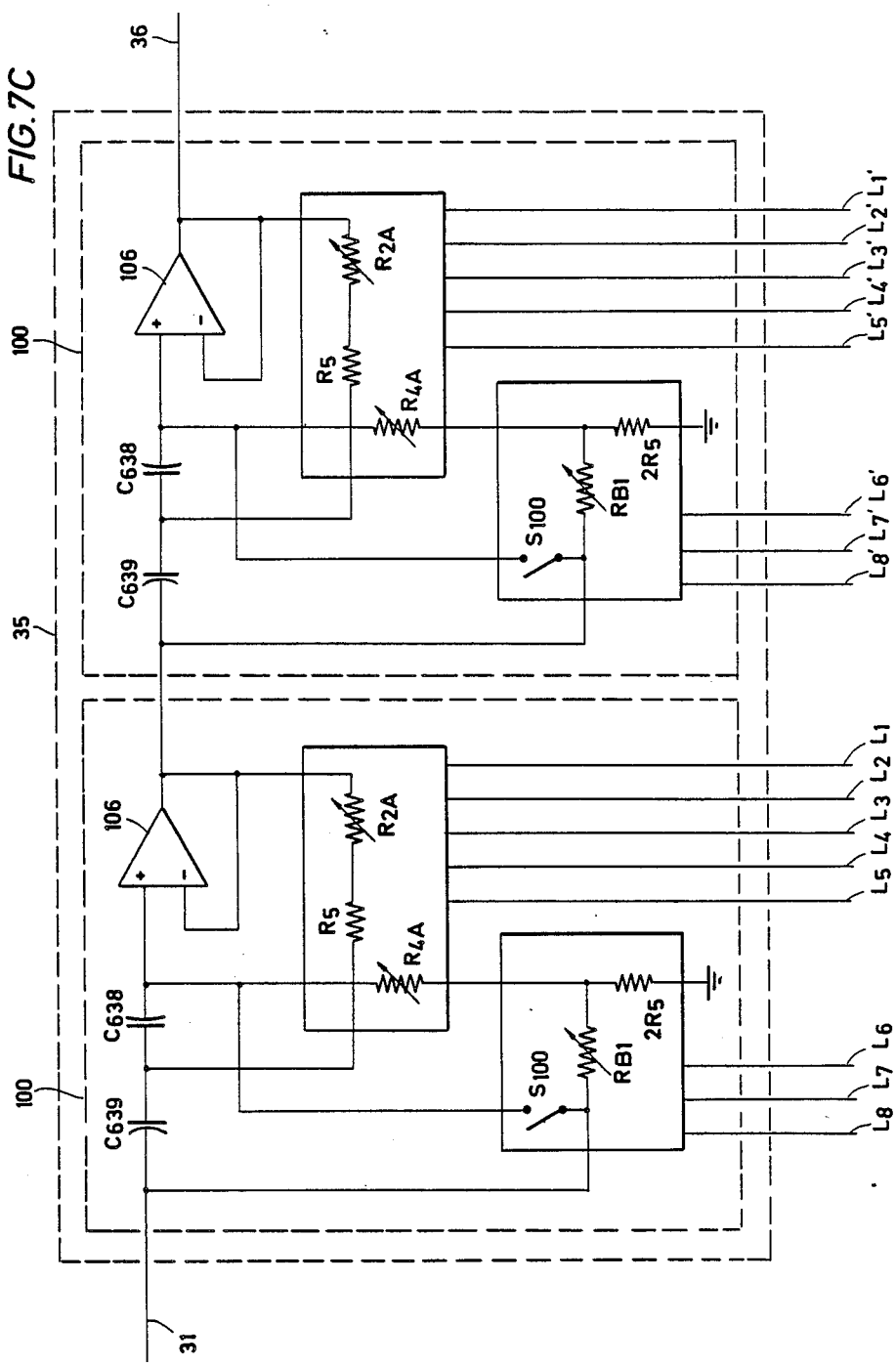

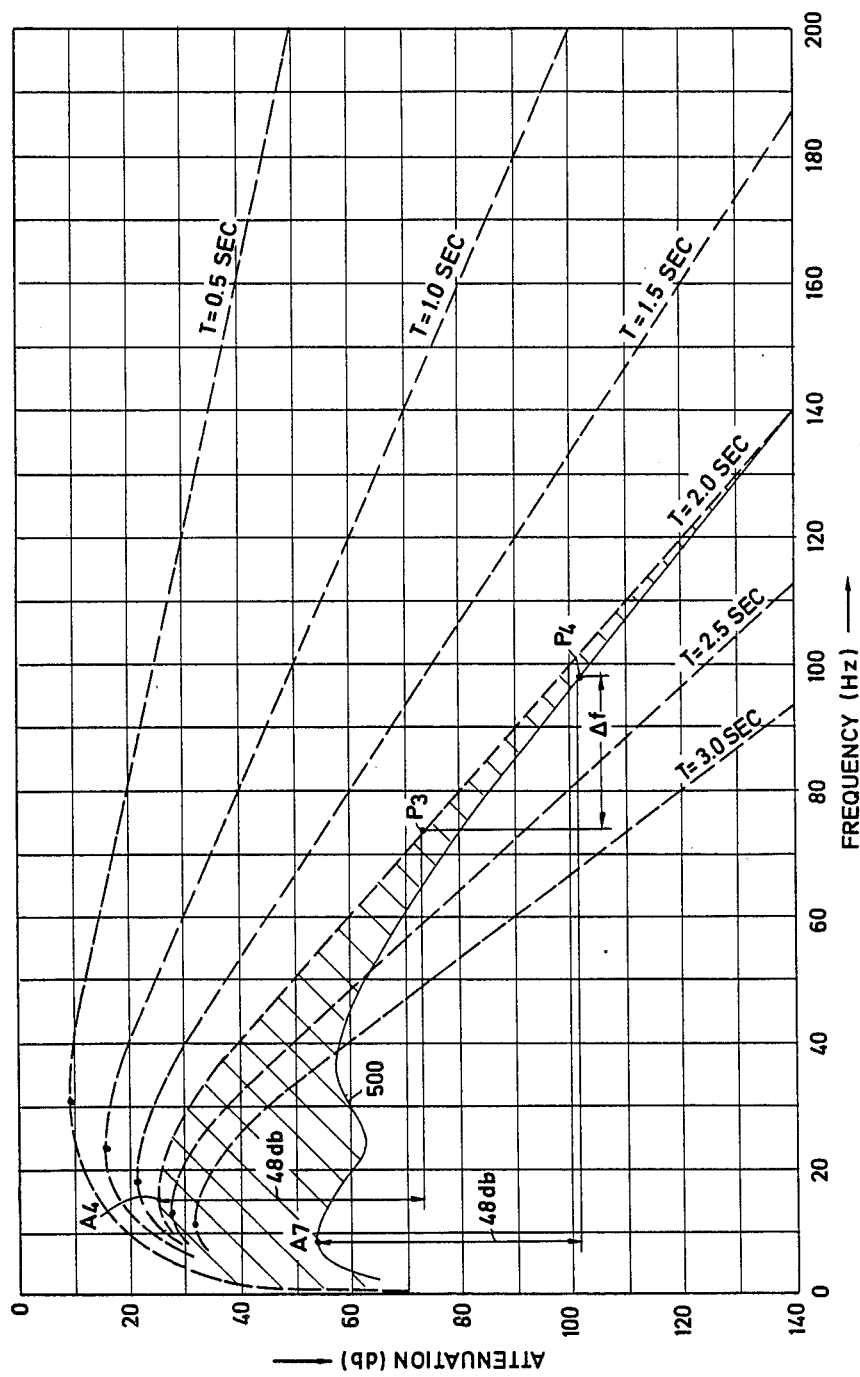

BANDWIDTH ENHANCING SEISMIC ACQUISITION SYSTEM AND METHOD

BACKGROUND OF THE INVENTION

1. Field of the Invention

This invention relates generally to geophysical data acquisition systems, and in particular to a geophysical field acquisition system with circuitry which increases effective system bandwidth. Still more particularly, the invention relates to a geophysical acquisition system having circuitry which may be configured by operator control during seismic exploration operations to increase the effective bandwidth of the combination of earth acting as a filter to seismic signals and the geophysical acquisition system.

2. Description of the Prior Art

Recording systems for providing a permanent record, typically on magnetic tape, of geophysical data acquired in field operations are well known. For the purpose of this disclosure the term "geophysical data" includes data acquired in a land prospecting environment, where the sensors may be seismometers, geophones, or other types of sensors, as well as data acquired in a marine prospecting environment where the sensors may be hydrophones or the like. A typical digital field recording system is that disclosed in U.S. Pat. No. 3,819,864.

Various designs of geophysical acquisition systems (also called seismographs and field acquisition systems) exist, the simplest being fixed systems where amplifier gain is preset and constant. Such prior art systems have a preamplifier stage, an analog gain stage, low-cut filters, notch filters, and high-cut anti-alias filters for each channel. A multiplexer switches the data channel sequentially to an analog to digital (A/D) converter which outputs a binary signal proportional to the input voltage.

An important parameter of such geophysical acquisition systems is their dynamic range. Dynamic range is defined as the difference in DB between the largest input signal that can be processed and recorded, i.e., the signal having an amplitude just below that which would cause saturation in some element of the system, and the smallest signal which can be properly recorded by the system, generally considered to be a signal to noise ratio of 1. Dynamic range is commonly expressed as the ratio of the largest to the smallest signal and is typically expressed in decibels or dB.

The number of steps the A/D converter breaks the signal into defines the precision of the system. If it is broken into 12 bits, the system is more precise than if it is broken into 8 bits. An A/D converter is designed to accept a certain maximum voltage. It is important to amplify seismic signals (geophysical data) until the maximum voltages applied to the A/D converter are as close to (but not greater than) that value as possible. Using as many of the bits of the digital word as possible increases its significance. The significance of the digital word relates to the number of bits recorded above the system noise level. In other words, to take full advantage of the geophysical acquisition system, from a "significance" point of view, the signal must be amplified before the A/D stage with the gain of the amplifier being set as high as possible without saturating the electronics. The electronics become saturated when the largest voltage applied to the A/D converter is too big for converter full scale.

At any specific gain setting, a digital system can operate only within a defined input voltage range without the signal being either below the noise level or above saturation. The minimum detectable voltage is the larger of the threshold voltage for the least significant bit or the system noise level. The maximum detectable voltage is the level at which the A/D converter becomes saturated and outputs its largest possible digital number. Signals above the maximum level are truncated, either in their analog state or after conversion to digital form.

The systems typically used for petroleum exploration are designed to adjust their gains automatically according to the incoming signal and also to record the gain setting. These are floating-point systems where the number is recorded in exponent-mantissa scientific notation. The output from the A/D converter is the mantissa and the gain setting is the exponent. Binary gain systems were the first of these systems; an example is Texas Instruments' DFS III which is gain ranged in 6 dB increments (single bit shifts). The digital number is recorded as a 15-bit word and the gain is recorded in a 4-bit exponent. With binary gain systems, several (from 15 to 60 ) calls to shift are required before gain is increased. A single call is needed to decrease gain.

The next generation of gain ranging amplifier recording systems was the instantaneous floating-point (IFP) system. Only one call is required to increase gain by any amount. The Texas Instruments DFS IV and DFS V are examples of such instruments. The gain increment for these instruments is 12 dB (2-bit shift) but could have other step ratios as well, such as 2:1 (6 dB) and 8:1 (18 dB).

When the processing of the digital signals is accomplished using digital filters and the like, the effective dynamic range of a signal that can be recorded from a maximum significance point of view, is less than the actual dynamic range of signals applied to the A/D converter. For a 16 bit A/D converter (15 bit mantissa, 1 sign), the effective dynamic range of the A/D converter and digital processing elements of the system is between 40 and 50 dB.

When an explosive source generates a seismic signal into the earth, the signal is actually a composite signal or sum of many different oscillatory signals or waves which propagate into the earth and are reflected or refracted back toward the geophones of the geophysical acquisition system. The spectrum of the generated signal depends on the weight and type of explosive, its shape and the material around it. In typical land seismic explorations, the energy peak of the generated spectrum is in the 10 to 30 Hz range, with a typical value of 15 Hz. At frequencies higher than the peak, the energy decreases at about 6 dB per octave. The shape of the generated energy spectrum of compressed air ("air gun") and mass impact devices is similar to that of an explosive source.

The spectrum of vibratory sources (e.g., Vibroseis, a trademark of Conoco, Inc.) can be controlled by the use of nonlinear sweep signals. The high frequency energy of resulting source seismic signals can be increased.

For any spectrum of seismic waves input into the earth by one of the sources mentioned above, the earth responds as an attenuation filter. The frequency components of multiple frequency seismic waves have a propagation velocity which is about the same for any frequency, but each frequency of the composite wave is attenuated at about 0.5 dB per its wavelength. The number of dB of attenuation for each component of the wave doubles with each doubling of frequency. A doubling of the attenuation as measured in number of dB is equivalent to an exponential increase in attenuation. Thus, as a function of frequency, the seismic waves (having a generated energy spectrum) are attenuated exponentially with increases in frequency.

The waves propagating through the earth are also attenuated exponentially as a function of time. As a result, the attenuation spectrum of the earth (considered as a signal filter) changes exponentially with time and frequency. At any specific time, the energy spectrum of the returning waves is acted on by the "earth filter" and sensors which typically reaches a maximum level in a frequency range from about 10 to 40 Hz and then decays exponentially with frequency. Considering the generated spectrum of frequencies, as acted on by the "earth filter" and sensor at any particular time after source initiation, is like taking a "snapshot" of the energy content of returning waves from a certain depth in the earth, considering that the propagation velocity of elastic waves is fairly well known. The later in time the snapshot is taken, the deeper the "look" into the formation.

In view of the "effective dynamic range" of the A/D converter and digital processing systems of a modern geophysical acquisition system, the "effective system bandwidth" of the combination of the "earth filter" and the seismic acquisition system can be approximated. At any time after seismic energy is applied to the earth, the maximum signal amplitude of the spectrum is determined, recognizing that the gain of the gain ranging amplifier is set to produce a near maximum signal level to the A/D converter. The effective dynamic range, in dB, is then subtracted from the level of the maximum signal level in dB to produce a signal level in dB, below the maximum signal level, to establish an attenuation level of the earth-acquisition system, below which signals can not be measured with full "significance" as defined above. That lower signal level, or significance level, then allows determination of the effective earth-acquisition system bandwidth, defined as the band of seismic signals which may be recorded with full significance. The effective bandwidth so defined changes with each snapshot or time after the seismic signals are generated and input into the earth.

It is important that the effective bandwidth of the earth-acquisition system be as wide as possible so that earth layers of smaller relative thickness may be resolved. Resolution may be defined as the limit at which two features can be distinguished from the effects of one feature. An acquisition system which enhances the effective bandwidth of the earth-acquisition system simply has more earth layer resolving capability than one with less effective bandwidth.

Low-cut filters have been used in the prior art to enhance effective system bandwidth. Knapp and Stepples describe a cut-off frequency of 80 Hz, 24 dB/octave low-cut filter prior to digitizing for a geophysical acquisition system in GEOPHYSICS, Vo. 51, No. 2 (Feb. 1986) at page 288. Knapp and Steeples suggest that the filter cut-off frequency should not be so high and the roll off slope so steep as to filter away all of the signal, but it is also important that it be high enough to attenuate high-amplitude, low frequency signal and low-frequency noise that might mask low amplitude signals.

Identification of Objects of the Invention

It is a general object of this invention to provide an apparatus and method for increasing the effective bandwidth of a geophysical data acquisition system for recording seismic signals returning from the earth.

It is another object of the invention to provide a low-cut filter in a geophysical data acquisition system which increases effective system bandwidth but simultaneously allows recording of low frequency signals returning from deep within the earth.

It is still another object of the invention to provide in a geophysical data acquisition system an attenuation limited low-cut filter having an operator selectable cut-off frequency, and maximum attenuation level at low frequencies to increase effective system bandwidth.

It is another object of the invention to provide in a geophysical data acquisition system a filter having a substantially constant gain below a lower cut-off frequency, gain increasing with increasing frequency in a transitional band above the lower cut-off frequency, and a constant gain above the upper limit of the transition band.

It is another object of the invention to provide in a geophysical acquisition system a spectral shaping filter disposed in the input stage of the system so as to minimize system input noise while simultaneously enhancing effective system bandwidth.

Another object of the invention is to provide in a geophysical acquisition system a spectral shaping filter having an operator selectable lower cut-off frequency, and gain boost following such lower cut-off frequency to increase effective earth/acquisition system bandwidth.

It is still another object of the invention to provide a method of geophysical field operations whereby a field operating specialist may determine the spectral characteristics of the earth and adjust attenuation limited low-cut filter and spectral shaping filter parameters in order to enhance the spectral characteristics of the seismic acquisition system to signals returning from a specific energy source and earth location, thereby increasing the resolution of signals acquired.

SUMMARY

The objects identified above, as well as other advantages and features of the invention, are achieved in a geophysical acquisition system having an input stage with a spectral shaping filter. The system further includes an attenuation limited low-cut filter. The spectral shaping filter has a selectable low cut-off frequency and a selectable gain boost following the low cut-off frequency. The attenuation at low frequencies and the cut-off frequency of the low-cut filter are also operator selectable.

In use of the geophysical acquisition system according to the invention, a geophysical acquisition specialist or operator first performs a test recording of the system with the low-cut filter and spectral shaping filter effectively out of the system to determine the spectral peak of the returning waves from the earth at a predetermined time or times after generation of the seismic signals. The cut-off frequencies and attenuation or gain of the attenuation limited low-cut filter and spectral shaping filter are operator selected as a function of the frequency of a test spectral peak.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which:

FIG. 6 is an example of the attenuation spectra of the earth and sensor at a number of times following seismic signal generation, the example showing the effective system bandwidth enhancement of a spectral shaping filter;

FIG. 7C is a schematic drawing of a preferred embodiment of an attenuation limited filter of the geophysical acquisition system of FIG. 2 including two stages of the filters illustrated in FIG. 7A and characterized by operator selectable low cut-off frequency and attenuation level at low frequencies; and FIG. 8 is an example of the attenuation spectra of the earth and sensor at a number of times following seismic signal generation, the example showing the effective system bandwidth enhancement of an attenuation limited low-cut filter at one of those times.

DESCRIPTION OF THE INVENTION

Figure 1:
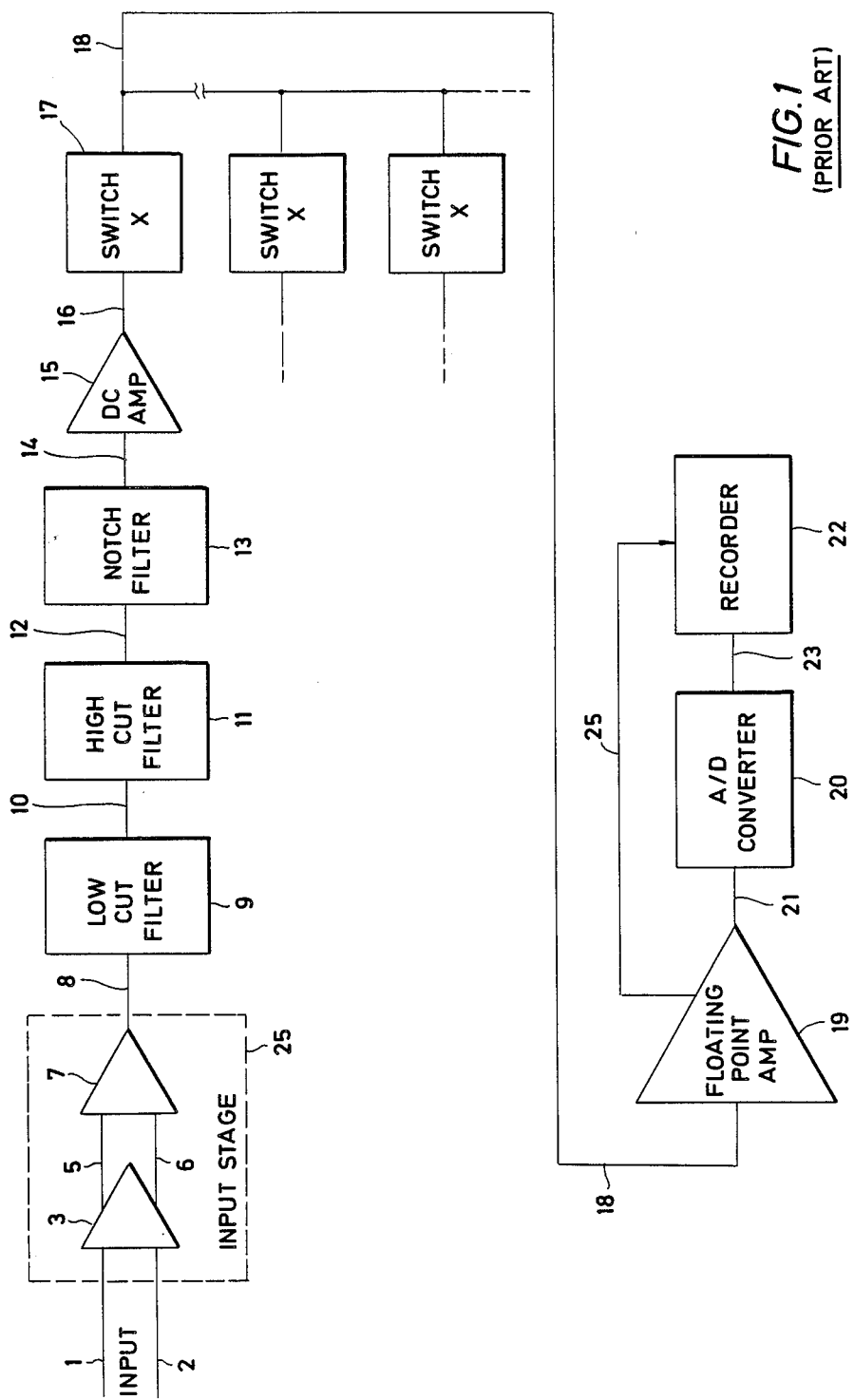
FIG. 1 is a block diagram of a typical prior art geophysical data acquisition system.

FIG. 1 is a block diagram of a typical prior art geophysical data acquisition system. The input to such a system is normally provided by a cable comprised of a plurality of twisted pair signal conductors. In the case of land seismic prospecting, each twisted pair is connected at some remote location to a geophone or geophone group. In the case of marine prospecting, the twisted pairs are enclosed in a streamer which is towed behind a prospecting boat and are connected at remote locations to hydrophones or hydrophone groups. In either case a plurality of channels of data are available to be recorded by the data collection system. Each twisted pair provides a differential signal which is not referenced to ground.

With reference to FIG. 1, one such signal is coupled to an input stage or preamplifier 25 of a channel of the data collection system by leads 1 and 2. The signal enters differential amplifier 3 which, in turn, provides a differential output on lines 5 and 6 to differential amplifier 7. Amplifier 7 is designed to provide a high common mode rejection and to convert the differential signal to a single ended signal on line 8. Amplifiers 3 and 7 comprise an input stage or preamplifier 25. Preferably amplifier 3 should have a lower equivalent input noise and a high gain. The high gain amplifies the received signals to a sufficiently high level such that the noise contributed by the following devices is insignificant relative to the noise contribution of amplifier 3. Amplifier 7 typically has a gain near unity.

Other means for coupling the cable signals to the data collection system are known including those disclosed in U.S. Pat. Nos. 3,778,759 and 3,972,020.

The preamplifier output is coupled by lead 8 to low-cut filter 9. The function of low-cut filter 9 is to attenuate low frequency signals. Line 10 couples the output of the low-cut filter to a high-cut filter 11. The high-cut filter attenuates high frequencies and typically has a slope of 72 dB per octave. Since the analog signals are to be sampled and digitized at a later point in the system, the steep slope of high-cut filter 11 is used to assure that frequencies above one-half the sampling frequency are attenuated to prevent significant frequency folding.

The output of high-cut filter 11 is coupled by lead 12 to notch filter 13. The reject band of notch filter 13 is centered at the power line frequency so as to attenuate any pickup from nearby power lines. High-cut filters and notch filters are well known in the art and require no further discussion here. In some systems it has been known for the notch filter to precede the high-cut filter or for the high-cut filter to precede the low-cut filter.

The output of the notch filter is coupled by lead 14 to the input of a low drift DC amplifier 15. Typically, the amplifier 15 has a gain of near unity and a low output impedance. The low drift requirement stems from the fact that the remainder of the data acquisition system is DC coupled. The output of amplifier 15 is coupled by lead 16 to multiplexer switch 17. Multiplexer switch 17 is typically a semiconductor switch which is closed for a very brief time period so as to provide a sample of the data from the illustrated channel via lead 18 to the input of gain ranging amplifier 19.

That portion of the data collection system described to this point, that is the channel between the input signal and line 18, is duplicated for each channel of input data to be recorded by the system. The various multiplexer switches such as switch 17 are successively closed for brief periods so as to provide on lead 18 a continuous succession of analog samples from the various data channels.

These various samples, after amplification by amplifier 19, are coupled by line 21 to analog-to-digital converter 20. The digitized output signals are coupled by lead 23 to a recorder 22 which, in the preferred embodiment, comprises a magnetic tape recorder. The geophysical data recording system as outlined above provides on magnetic tape digitized samples of the multichannel analog data received from the cable.

Most high quality analog-to-digital converters in current use have a dynamic range of 80 to 90 dB but may exceed 120 dB. Gain ranging amplifier 19 has the capability to automatically adjust its gain for each new data sample as the sample is received on lead 18. The gain is adjusted so as to ensure that the amplified signal appearing on lead 21 will fall within the acceptable range of the analog-to-digital converter. The actual gain setting of amplifier 19 is provided to recorder 22 on line 25 for recording along with the corresponding digitized sample appearing on line 23. One example of a suitable gain ranging amplifier is that disclosed in U.S. Pat. No. 3,684,968 incorporated herein. Specific embodiments of various components illustrated in FIG. 1 appear in a digital field system supplied by Texas Instruments Incorporated of Dallas, Tex. under the trademark DFS V.

Figure 2:
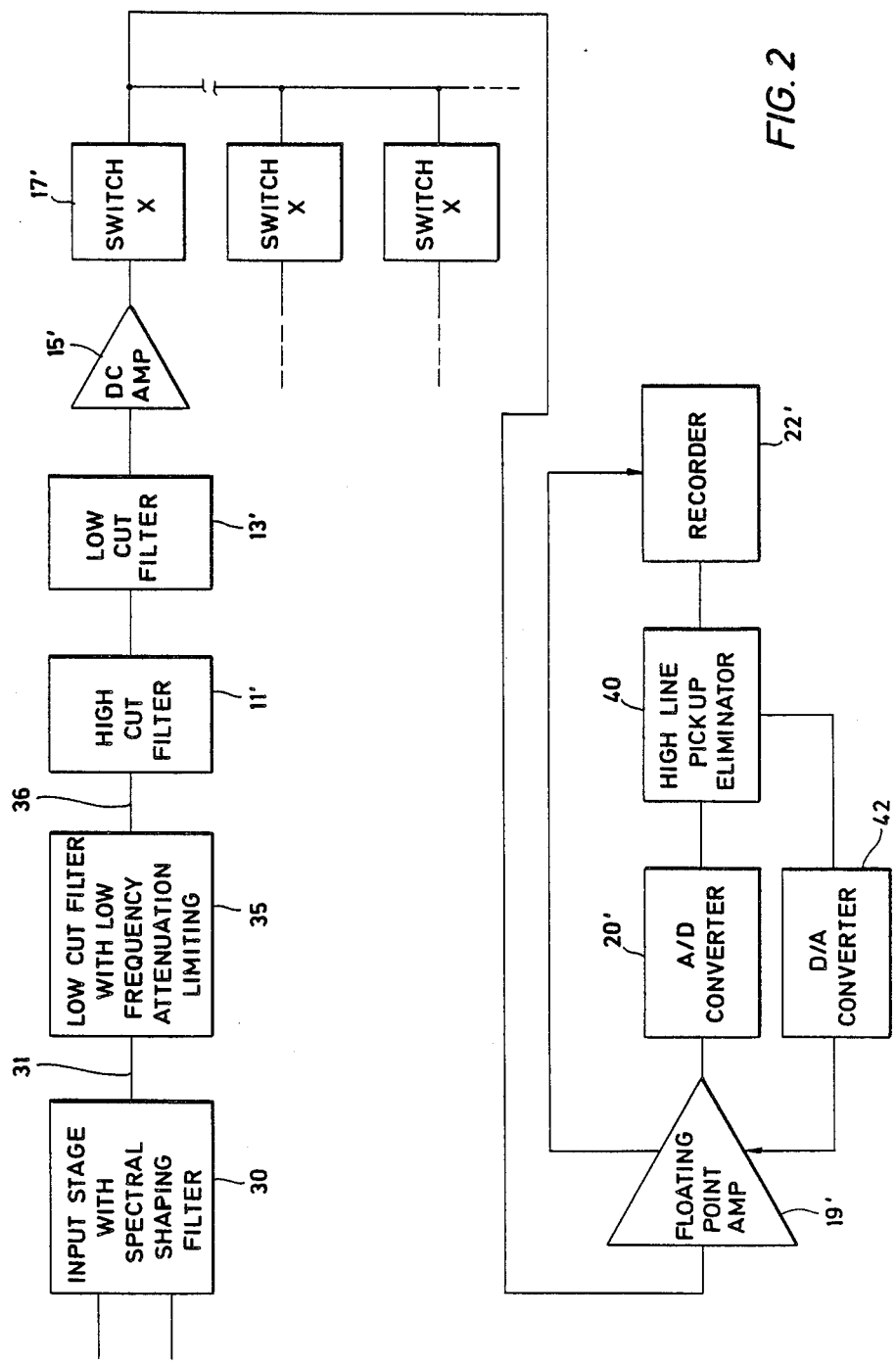
FIG. 2 is a block diagram of the geophysical data acquisition system of the invention incorporating an input stage with a spectral shaping filter followed by an attenuation limited low-cut filter.

FIG. 2 is a block diagram of the geophysical acquisition system according to the invention. It is similar to that of FIG. 1 but incorporates an input stage 30 including a spectral shaping filter and further incorporates an attenuation limited low-cut filter stage 35. The system of FIG. 2 incorporates a high line pickup eliminator circuit 40 which feeds analog information back to the gain ranging amplifier 19' via D/A converter 42. The high line pickup eliminator 40, obviating the need for a prior art notch filter, is described 5 in pending U.S. application Ser. No. 835,140 assigned to the assignee of this invention. Its operation is not described here, but it is incorporated by reference. An additional low-cut filter 13' is provided in the channel to filter extremely low frequencies.

Figure 3A:
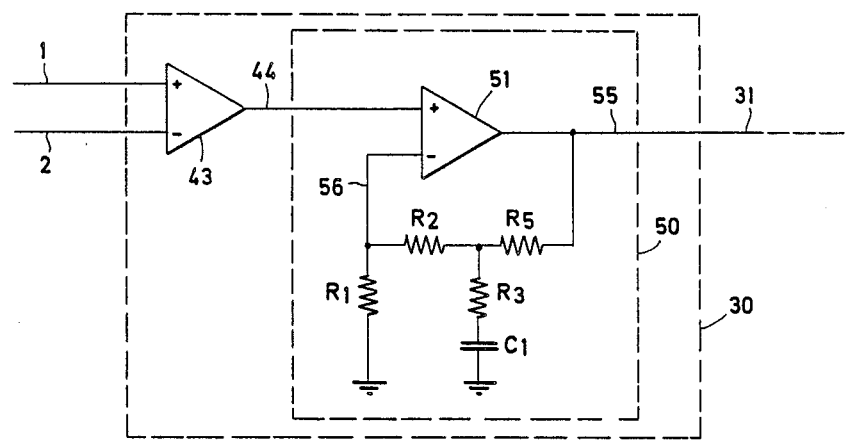
FIG. 3A is an embodiment of an input stage incorporating a single ended spectral shaping filter characterized by low cut-off frequency and gain boost above such low cut-off frequency.

FIG. 3A is a schematic diagram of an input stage 30 with a differential amplifier 43 followed by a single ended embodiment of a spectral shaping filter 50. FIG. 5 is a gain versus log frequency graph that describes in general the gain versus frequency characteristics of the spectral shaping circuit 50 of FIG. 3A as well as the circuits of FIGS. 3A, 3B, 4A, and 4B. The input stage 30 preferably has a gain of $G_1$ at DC frequency, a lower cut-off frequency $f_l$ followed by a gain which increases with increasing frequency until a boost gain of $G_2$ is approached at a cut-off frequency of $f_2$. Cut-off frequency is defined herein as the 3 dB point above or below the straight line approximation to the gain or attenuation response on a gain or attenuation versus log frequency graph.

An important feature of this invention is the placement of the spectral shaping circuit 50 in input stage 30. Typically, the higher the gain of the input stage is, the lower the equivalent input noise of the system. Placing the spectral shaping circuit 50 in the input stage provides gain boost before any of the higher noise circuits which follow, resulting in a lower equivalent system noise than if a spectral shaping circuit were to be placed in the system following the input stage.

Seismic signals returning from the earth are applied from a sensor such as a geophone to leads 1, 2 (FIG. 3A) to differential amplifier 43 which may have a gain of 4 or more. The output on lead 44 is applied to the positive input of an operational amplifier 51 of spectral shaping circuit 50. Circuit 50 includes resistance/capacitance (RC) feedback network which applies the output signal on lead 55 to the negative input of operational amplifier 51 via lead 56. The DC gain $G_1$ of spectral shaping circuit 50 is dependent on the ratio of $R_1$ to the sum of $R_1$, $R_2$ and $R_5$. The high frequency gain $G_2$ is a function of the resistors $R_1$, $R_2$, $R_3$ and $R_5$. The gain between cut-off frequencies $f_1$ and $f_2$ rises at slopes approaching 6 dB/octave (20 dB/decade) rate. The lower cut-off frequency $f_1$ is a function of the capacitor $C_1$ and the resistors $R_1$, $R_2$, $R_3$ and $R_5$. Selecting the lower cut-off frequency $f_1$, the DC gain $G_1$, the difference in gain, or gain boost $(G_2-G_1)$ in DB determines the proper numerical values for $R_1$, $R_2$, $R_3$, $R_5$ and $C_1$.

Figure 3B:
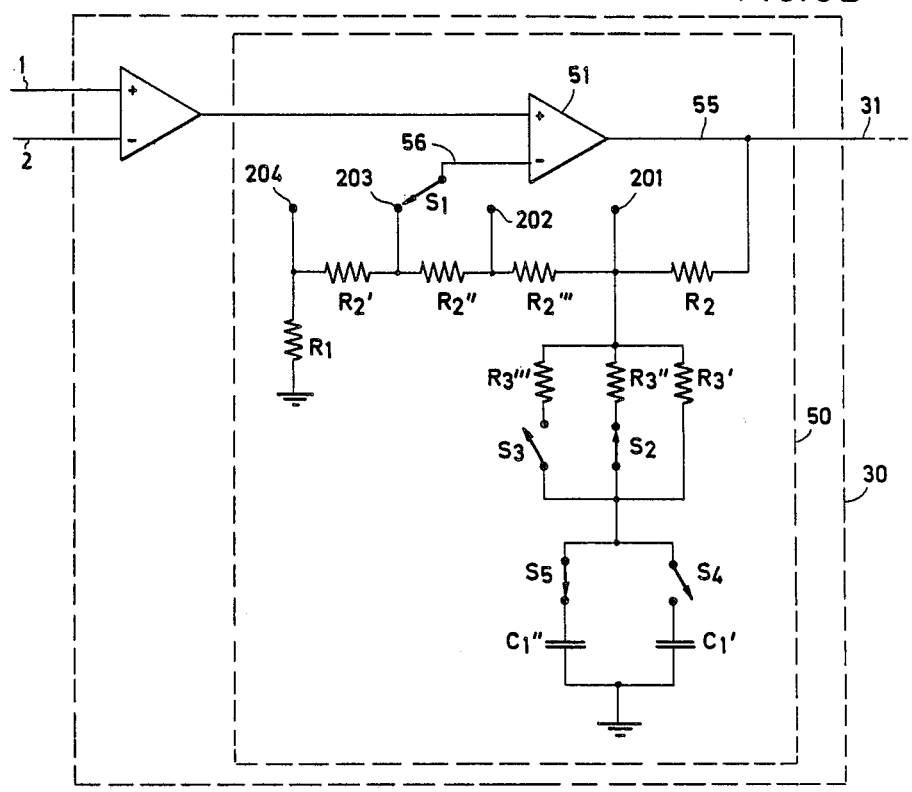
FIG. 3B is an embodiment of an input stage incorporating a single ended spectral shaping filter characterized by operator selectable low cut-off frequency and gain boost above such frequency.

The input stage of FIG. 3B is of identical form as that of FIG. 3A except that the resistor and capacitor values in the circuit of FIG. 3B, analogous to those of FIG. 3A, may be changed in value by means of switches $S_1$, $S_2$, $S_3$, $S_4$ and $S_5$ Three values of capacitance $C_1$ may be inserted in the circuit by closing either switch $S_4$ or $S_5$ or closing both switches $S_4$ and $S_5$. One of four values for $R_3$ may be inserted in the circuit 50 by opening or closing switches $S_2$ and $S_3$ to insert or not insert $R_3''$ or $R_3'''$ in parallel with $R_3$. The switch $S_1$ may be closed to a number of different points 201–204 to change the amount of output signal on output lead 55 that is fed back to the negative input of operational amplifier 51 via lead 56. Representative values for resistors and capacitors of FIG. 3B follow in Table I.

TABLE I

| $R_1$ | 87 ohms |
|---|---|
| $R_2'$ | 261 ohms |
| $R_2''$ | 1,044 ohms |
| $R_2'''$ | 4,176 ohms |
| $R_5$ | 25,056 ohms |
| $R_3'$ | 1,516 ohms |
| $R_3''$ | 1,129 ohms |
| $R_3'''$ | 566 ohms |
| $C_1'$ | 1 $\mu$F |
| $C_1''$ | 1.625 $\mu$F |

With the values of the resistors and capacitors shown in Table I, it is evident that switch $S_1$ controls the DC gain $G_1$ of the circuit.

If switch $S_1$ is connected to positions 200, 201, 203 or 204, the effective $R_1$ ($R_1$ eff) and $R_2$ ($R_2$ eff) of FIG. 3B equivalent to $R_1$ and $R_2$ of FIG. 3A are as follows in Table II, with the DC gain of circuit 50 tabulated.

TABLE II

| Switch Position | DC Gain | $R_1$ Eff | $R_2$ Eff |
|---|---|---|---|
| 201 | 5.5 | 5568 | 0 |
| 202 | 22 | 1392 | 4176 |
| 203 | 88 | 348 | 5220 |
| 204 | 352 | 87 | 5481 |

Switches $S_2$ and $S_3$ control the boost gain $(G_2-G_1)$ in DB above DC gain $G_1$ for the circuit.

With the notation of $R_3$ referring to the amount of resistance inserted in series with the capacitors $C_1'$ or $C_1''$, the amount of gain boost from the DC gain is tabulated below in Table III.

TABLE III

| Switch Positions of $S_2$ and $S_3$ | Approx. Boost (dB) | Approx. Boost (gain) | $R_3$ |
|---|---|---|---|
| $S_2$ & $S_3$ open | 12 | 4.01 | 1516 |
| $S_2$ closed | 18 | 8.0 | 647 |
| $S_2$ & $S_3$ closed | 24 | 16.01 | 302 |
| $S_3$ closed | | —(not used)— | |

Switches $S_4$ and $S_5$ control the lower cut-off frequency $f_1$ of the circuit. With the notation $C_1$ referring to the amount of capacitance inserted in series with combinations of resistors $R_3'$ and $R_3''$ and $R_3'''$, the lower cut-off frequency $f_1$ is tabulated for the switch positions of $S_4$ and $S_5$ in Table IV. The upper cut-off frequency $f_2$ which also results is tabulated.

TABLE IV

| Switch Position of $S_4$ and $S_5$ | Capacitance $C_1(\mu f)$ | $R_3 = 3030$ +12dB $f_1$ | $f_2$ | $R_3 = 1294$ +18dB $f_1$ | $f_2$ | $R_3 = 603$ +24dB $f_1$ | $f_2$ |
|---|---|---|---|---|---|---|---|
| $S_4$ closed, $S_5$ open | 1.0 | 26.2 | 105.0 | 30.6 | 246.0 | 32.8 | 527.4 |
| $S_4$ open, $S_5$ closed | 1.625 | 16.1 | 64.7 | 18.8 | 151.3 | 20.2 | 324.5 |
| $S_4$ closed, $S_5$ closed | 2.625 | 10.0 | 40.0 | 11.65 | 93.7 | 12.5 | 200.9 |

Tables II, III, and IV demonstrate that by appropriate manipulation of switches $S_1-S_5$, the DC gain $G_1$, the lower cut-off frequency $f_1$, and the boost gain $G_2-G_1$ in B added by circuit 50 (and of course of circuit 30) of FIG. 3B may be set, under operator control during field operations.

Figure 4A:
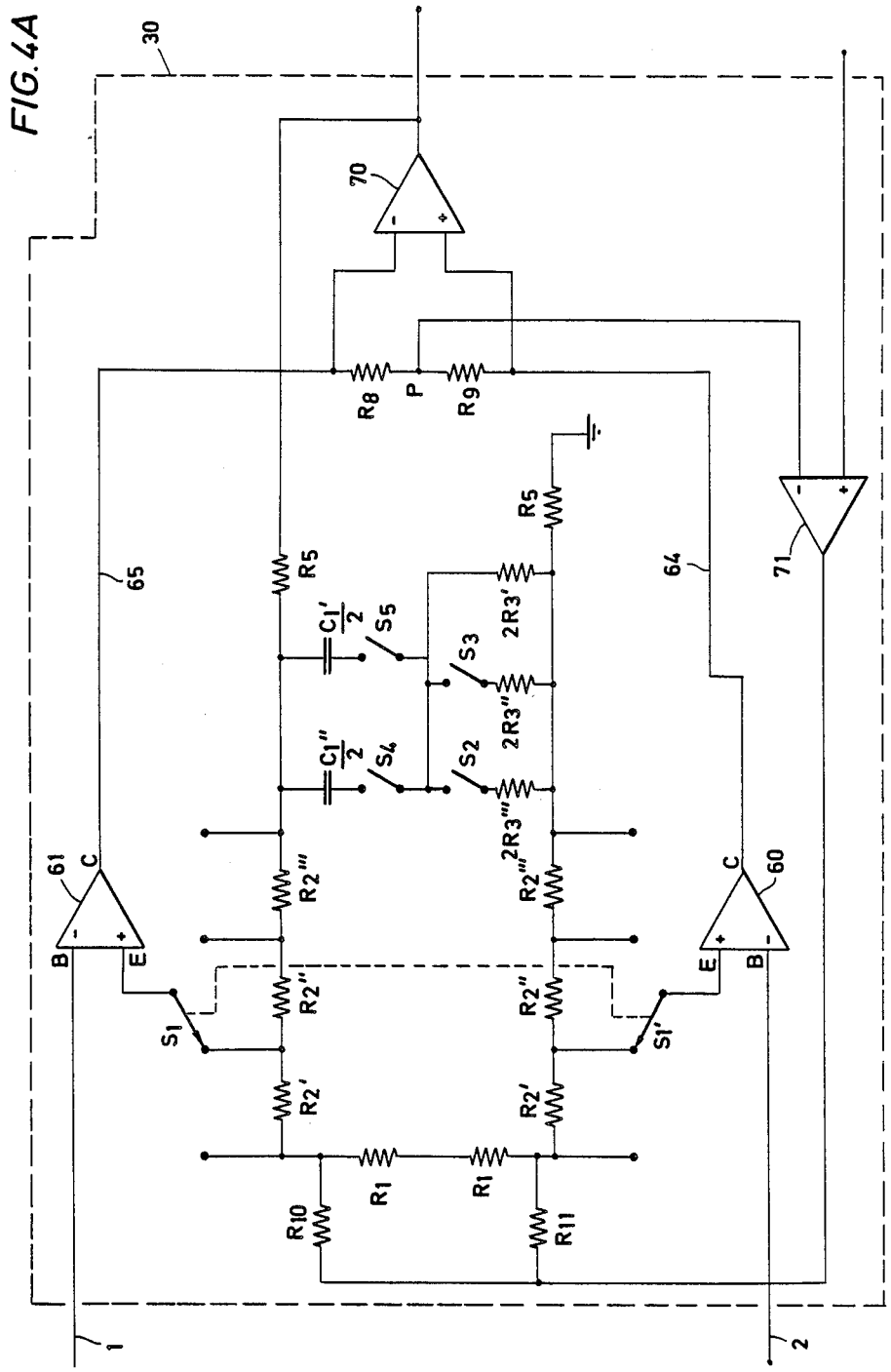
FIG. 4A is an embodiment of a differential input stage incorporating a spectral shaping filter characterized by an operator selectable low cut-off frequency and an operator selectable gain boost above such frequency.
Figure 5:
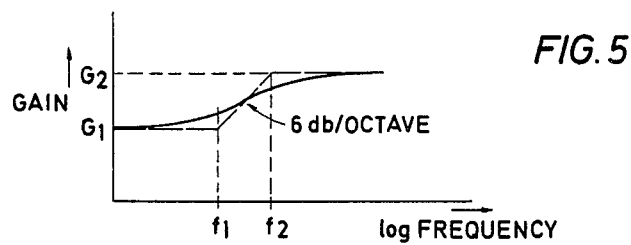
FIG. 5 is a graph of gain versus log frequency of a spectral shaping boost filter with operator selectable low cut-off frequency and gain boost.

FIG. 4A illustrates the spectral shaping input stage 30 in an embodiment of the circuit which directly accepts the differential input signal on leads 1 and 2. Amplifiers 60, 61 may be transistors with the leads 1 and 2 connected to the bases B thereof. The outputs of the collectors C of amplifiers 60, 61 are applied differentially from leads 64 and 65 to operational amplifier 70. The output of amplifier 70 (which is the output of the spectral shaping input stage 30 of the embodiment of FIG. 4A) is applied to the positive inputs (or emitters) of amplifiers 61 and 60 via functionally identical feedback networks as the feedback network illustrated in FIG. 3B. Switches $S_1$ and $S_1'$ are ganged together to ensure that the DC gain selected by appropriate ratios of $R_1$ and $R_2'$, $R_2''$ and $R_2'''$ are the same. The cut-off frequency $f_1$ is selected in the same way as for FIG. 3B by selecting the positions of switches $S_4$ and $S_5$ to bring $C_1''/2$ or $C_2'/2$ or $C_1'/2$ and $C_1''/2$ into the circuit. Spectral boost, expressed in dB, as high frequency gain $G_2$ minus by low frequency gain $G_1$, is selectable by positioning switches $S_2$ and $S_3$ to put $2R_3''$ in parallel with $2R_3'$, or $2R_3'''$ in parallel with $2R_3'$ or both $2R_3''$ and $2R_3'''$ in parallel with resistor $2R_3'$. The values of the resistors and capacitors of Table I correspond to those shown in FIG. 4A.

The common mode signal appearing at point P between 1 meg resistors $R_8$ and $R_9$ is applied via operational amplifier 71 ia resistors $R_{10}$ and $R_{11}$ for application to the emitters of transistor amplifiers 60 and 61. Resistors $R_{10}$ and $R_{11}$ of FIG. 4A are preferably 2087 ohms. Transistors 60, 61 are each one-half of a commercially available two transistor package MAT-01 and operational amplifier 70 is a commercially available circuit LT1008.

Figure 4B:
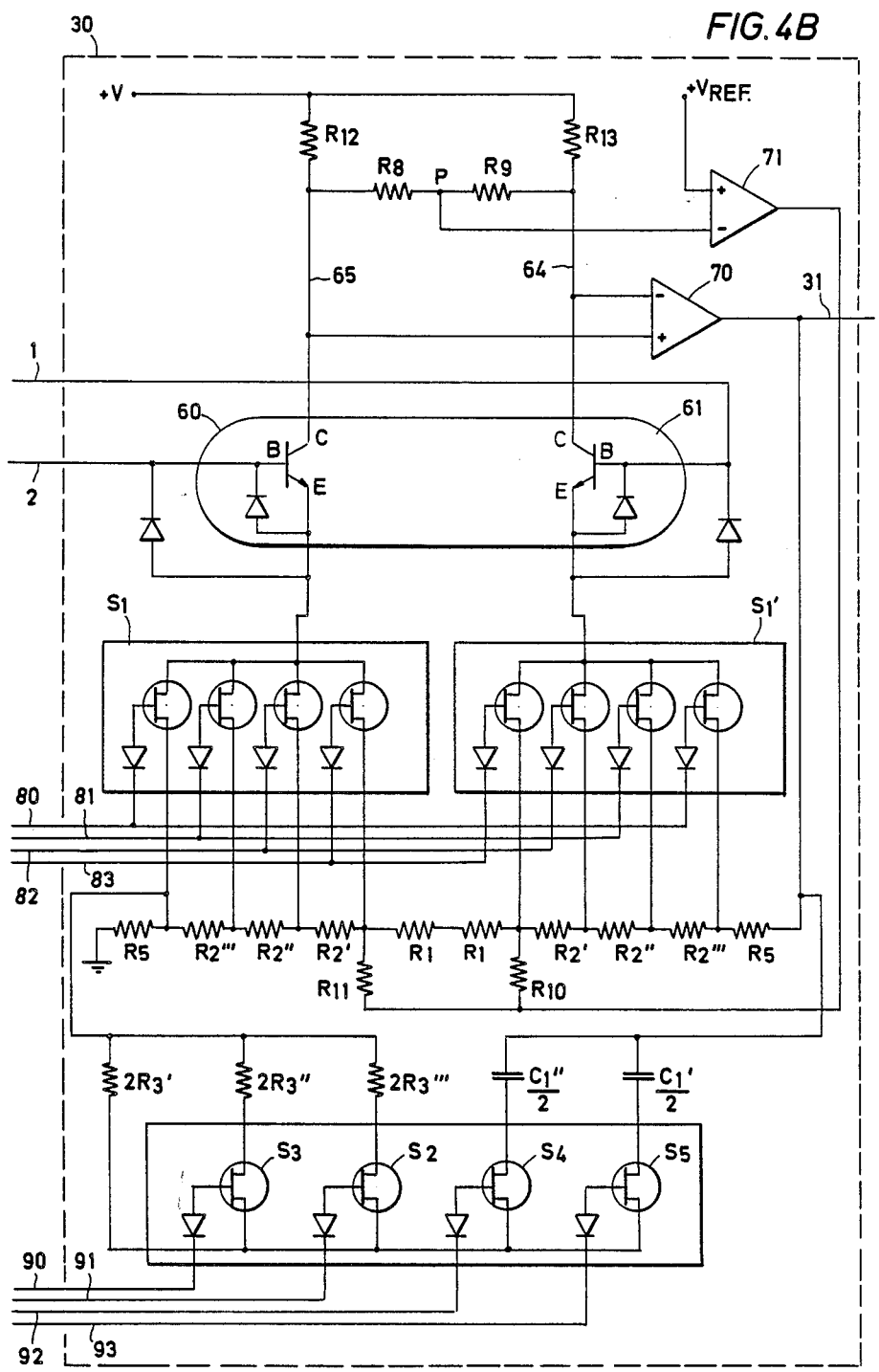
FIG. 4B is a schematic drawing of a preferred embodiment of a differential input stage of the geophysical acquisition system of FIG. 2 including a spectral shaping filter characterized by operator selectable low cut-off frequency and gain boost above such frequency.

FIG. 4B shows the preferred embodiment of the spectral shaping input stage of FIG. 4A. Transistors 60 and 61 are each one-half of the commercially available package MAT-01. The transistors are supplied from a 15 volt source through 100K ohm resistors $R_{l2}$ and $R_{l3}$. The operational amplifier 70 is a commercially available circuit LT1008. The common mode operational amplifier 71, having a 10 volt reference source applied to its positive input, is one-half of a commercially available circuit LF442.

Switches $S_1$ and $S_1'$ are voltage controlled field effect transistor (FET) switches corresponding to switches $S_1$ and $S_1'$ of FIG. 4A. Voltage applied individually to leads 80-83 cause the corresponding FETs to conduct, thereby connecting the emitters of transistors 61 and 60 to the positions between the resistors $R_1$, $R_2'$, $R_2''$, $R_2'''$ and $R_5$.

Switches $S_2$ and $S_3$ are voltage controlled FETs corresponding to switches $S_2$ and $S_3$ of FIG. 4A. Voltage applied individually or simultaneously to leads 90 and 91 closes switches $S_2$ and $S_3$. Switches $S_4$ and $S_5$ are voltage controlled FETs corresponding to switches $S_4$ and $S_5$ of FIG. 4A. Voltage applied individually or simultaneously to leads 92 and 93 closes FET switches $S_4$ and $S_5$.

Voltages applied to leads 80 through 83 serve to set the 30 gain $G_1$ of the input stage 30. (Gains $G_1$, $G_2$ and lower cut-off frequency, $f_1$, are defined schematically in FIG. 5). A voltage applied to lead 80 achieves a "low gain $G_1$"; a voltage applied to lead 81 achieves a "medium low gain $G_1$"; a voltage applied to lead 82 achieves a "medium high gain $G_1$"; and a voltage applied to lead 83 achieves a "high gain $G_1$".

A voltage applied to lead 92 sets low cut-off frequency $f_1$ to a relatively high value (see Table IV above). A voltage applied to lead 93 provides a lower low cut-off frequency $f_1$ A voltage applied to both leads 92 and 93 provides a still lower low cut-off frequency. No voltage applied to leads 90 or 91 provides a low gain boost from gain $G_1$ to gain $G_2$. A voltage applied to lead 91 provides a medium gain boost from gain $G_1$ to gain $G_2$. A voltage applied to 90 and 91 provides a high gain boost. The voltages applied to leads 80-83 and 90-93 are preferably applied from a digital computer subject to operator control.

FIG. 6 illustrates the attenuation spectra of a typical section of earth as a function of time after a seismic generation. The dashed line curves represent the attenuation of the earth to seismic waves as a function of time and frequency. Time is treated as a parameter such that each time attenuation curve may be considered a "snap shot" of the frequency attenuation of the earth. The maximum point on the various curves are marked as $A_1$, $A_2$ . . . etc. In the system of FIG. 2, the gain ranging amplifier 19' automatically adjusts its gain such that a maximum amplitude of the composite seismic signal will not be greater than a maximum signal recognizable by A/D converter 70'. For each of the time curves of FIG. 6, the dynamic range of AD converter 70' and digital processing steps following the AD converter is taken as 48 dB to determine the effective system bandwidth. (Of course, the 48 dB is only an example for explaining the beneficial aspects of this invention.) For example, for the T=1 sec. spectrum, measured from maximum point $A_2$ results in line 301, which extends to point $P_1$, at about 127Hz. For returning seismic waves which are received 1 second following seismic generation, the bandwidth of the earth, (considering the seismic acquisition system of FIG. 2 to b in a flat bandwidth configuration over the frequencies of interest) is about 127Hz.

The solid curve above each earth and sensor spectrum (dashed) curve, show the result of applying spectral boosting with the circuits of FIG. 3B or 4B. For this example, 24 dB of spectral boost with the lower cut-off frequency set at about 20Hz was applied. It is seen that for the T=1 sec. spectrum, spectral boosting results in approximately 23 Hz additional bandwidth. Enhanced bandwidth of each spectrum at later times from seismic generation is also achieved, but of course, the increase in effective earth/acquisition system bandwidth is proportionately less. The effective earth/acquisition system bandwidth at T=3 is increased from about 51 Hz to about 54 Hz, a 3 Hz increase.

In operation, a seismic exploration specialist first makes a test shot, records the returning seismic signals from the earth, and then determines the frequency where the spectral peak occurs at a time such as T=1.0 or 2.0 seconds after seismic generation. Such spectral peak may be determined using fast fourier transform techniques. The low cut-off frequency $f_1$ of the circuits of FIGS. 3B or 4B should be set at a frequency about the same as or greater than the frequency of the determined spectral peak. The amount of boost gain is then selected to optimally enhance the effective system bandwidth for a particular depth of interest.

Figure 7A:
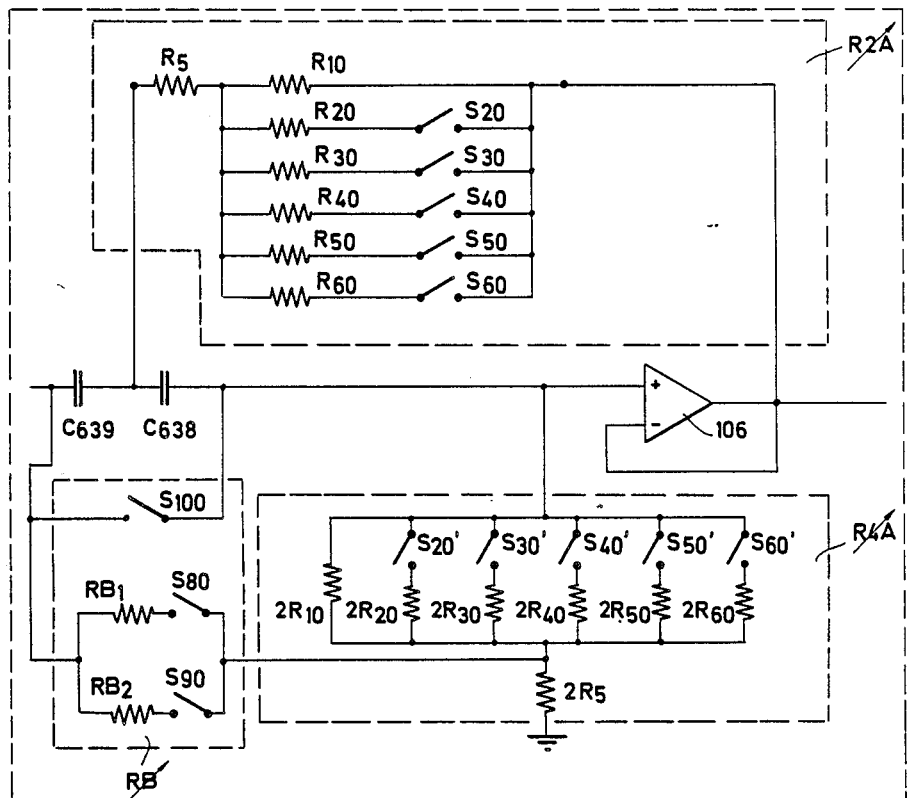
FIG. 7A is an embodiment of an attenuation limited low-cut filter characterized by a cut-off frequency and a fixed level of attenuation at low frequencies below such cut-off frequency.
Figure 7B:
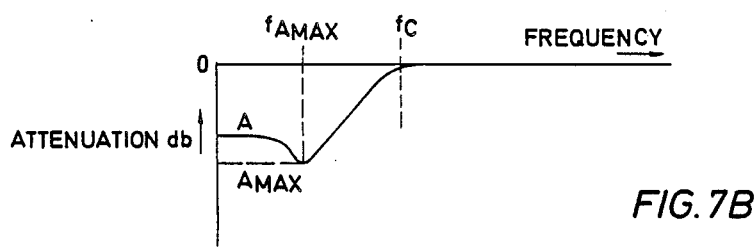
FIG. 7B is a graph of attenuation versus log frequency showing the frequency response of the circuit of FIG. 7A.

Turning now to FIG. 7A, a preferred circuit 100 which is embodied in duplicate stages (FIG. 7C) of low-cut filter 35 is illustrated. The circuit of FIG. 7A is a modified second-order low-cut filter which has an attenuation versus log frequency response as illustrated in FIG. 7B. The response of the circuit is similar to an ordinary low-cut filter with an increasing attenuation with decreasing frequency below the cut-off frequency $f_c$. However, the attenuation limit A in dB is reached at DC (zero frequency) after a maximum attenuation $A_{max}$ is reached at a frequency $f_{Amax}$ below the cut-off frequency $f_c$.

Although the preferred embodiment of the attenuation limited low-cut filter of the invention is shown in FIGS. 7A and 7C and its frequency response is shown in FIG. 7B, other attenuation limited low-cut filters may be used. Such other filters would have a frequency response characterized by a substantially constant attenuation at low frequencies and a decreasing attenuation with frequency higher than a cut-off frequency corresponding to frequency $f_{Amax}$ of FIG. 7B.

With the circuit 100 of FIG. 7A, the variable resistor $R_B$ is adjusted to set-up desired stop band floor attenuation limit A. The variable resistors R2A and R4A are adjusted to set the low cut-off frequency $f_c$. Table V below indicates the cut-off frequencies and attenuation limits in dB achieved for the various switch settings of FIG. 7A. Switches $S_{20}$–$S_{60}$ of variable resistor R2A are ganged with switches $S_{20}''$–$S_{60}'$ of variable resistor R4A. Table V assumes the following resistor values and capacitor values. A "1" indicates that a switch is closed; a "0" indicates that it is open.

| R5 | = | 1,000 ohms | C639 | = | .15 μf |
|---|---|---|---|---|---|
| R10 | = | 249,088 ohms | C638 | = | .15 μf |
| R20 | = | 296,716 ohms | | | |
| R30 | = | 129,625 ohms | RB1 | = | 29,698 ohms |
| R40 | = | 62,585 ohms | RB2 | = | 13,887 ohms |
| R50 | = | 30,016 ohms | | | |
| R60 | = | 13,905 ohms | | | |
| 2R5 | = | 2,000 ohms | | | |
| 2R10 | = | 498,176 ohms | | | |
| etc. | | | | | |

TABLE V

| GANGED SWITCHES S20-S60 and S20'-S60' | | | | | |
|---|---|---|---|---|---|
| S60 S60' | S50 S50' | S40 S40' | S30 S30' | S20 S20' | $fc_{nom}$ |
| 0 | 0 | 0 | 0 | 0 | 3.0 |
| 0 | 0 | 0 | 0 | 1 | 5.5 |
| 0 | 0 | 0 | 1 | 0 | 8.7 |
| 0 | 0 | 0 | 1 | 1 | 11.2 |
| 0 | 0 | 1 | 0 | 0 | 14.7 |
| 0 | 0 | 1 | 0 | 1 | 17.1 |

TABLE V-continued

| | | | | | |
|---|---|---|---|---|---|
| 0 | 0 | 1 | 1 | 0 | 20.2 |
| 0 | 0 | 1 | 1 | 1 | 22.6 |
| 0 | 1 | 0 | 0 | 0 | 27.0 |
| 0 | 1 | 0 | 0 | 1 | 29.3 |
| 0 | 1 | 0 | 1 | 0 | 32.3 |
| 0 | 1 | 0 | 1 | 1 | 34.6 |
| 0 | 1 | 1 | 0 | 0 | 38.0 |
| 0 | 1 | 1 | 0 | 1 | 40.2 |
| 0 | 1 | 1 | 1 | 0 | 43.2 |
| 0 | 1 | 1 | 1 | 1 | 45.4 |
| 1 | 0 | 0 | 0 | 0 | 52.9 |
| 1 | 0 | 0 | 0 | 1 | 55.1 |
| 1 | 0 | 0 | 1 | 0 | 57.9 |
| 1 | 0 | 0 | 1 | 1 | 60.1 |
| 1 | 0 | 1 | 0 | 0 | 63.2 |
| 1 | 0 | 1 | 0 | 1 | 65.3 |
| 1 | 0 | 1 | 1 | 0 | 68.0 |
| 1 | 0 | 1 | 1 | 1 | 70.1 |
| 1 | 1 | 0 | 0 | 0 | 73.9 |
| 1 | 1 | 0 | 0 | 1 | 75.9 |
| 1 | 1 | 0 | 1 | 0 | 78.6 |
| 1 | 1 | 0 | 1 | 1 | 80.6 |
| 1 | 1 | 1 | 0 | 0 | 83.5 |
| 1 | 1 | 1 | 0 | 1 | 85.5 |
| 1 | 1 | 1 | 1 | 0 | 88.0 |
| 1 | 1 | 1 | 1 | 1 | 90.0 |

| Switches S80 and S90 | | Attenuation | Cut-Off |
|---|---|---|---|
| S80 | S90 | A | Frequency |
| 0 | 0 | infinity | $f_c$ nom |
| 1 | 0 | −24 dB | 1.06 $f_c$ |
| 0 | 1 | −18 dB | 1.12 $f_c$ |
| 1 | 1 | −15.2 dB | 1.15 $f_c$ |

As Table V shows, the attenuation limited low-cut filter may be varied to produce three different attenuation limits A and a plurality of cut-off frequencies $f_c$ varying from about 3Hz to 104Hz. The frequency of maximum attenuation $f_{Amax}$, as indicated in the graph of FIG. 7B is related to the cut-off frequency $f_c$ by a factor K. The factor K is the ratio of maximum attenuation frequency $f_{Amax}$ to the normal cut-off frequency $f_c$ of the circuit. Table VI relates the attenuation limit A to the factor K, the octave ratio (the number of octaves below $f_c$ where $f_{Amax}$ occurs) and the maximum attenuation $A_{max}$ in dB.

TABLE VI

| A(dB) | K | Octave ratio | $A_{max}$ (dB) |
|---|---|---|---|
| −15.2 | 2.22 | 1.15 | −20 |
| −18 | 3.22 | 1.56 | −24 |
| −24 | 3.67 | 1.88 | −33 |

FIG. 7C illustrates the preferred embodiment of the attenuation limited low-cut filter 35 of FIG. 2. Two identical circuits 100, as shown in FIG. 7 and specified above in Tables V and VI are placed in series. The switches S20–S60, S20'–S60', and S80 and S90 are voltage controlled field effect transistors like those of FIG. 4B. Voltages applied to five leads L1–L5 to variable resistors R2 and R4A for each circuit 100 control switches S20–S60 and S20'–S60' Two leads L7 and L8 for each circuit 100 control switches S80 and S90. Bypass switches S100 are controlled by lead L6. Operational amplifiers 106 are preferably commercially available LT1012 operational amplifiers.

FIG. 8, like FIG. 6 illustrates the attenuation spectra of typical sections of earth as a function of time from a seismic generation. The dashed line curves represent the attenuation of the earth to seismic waves as a function of time and frequency. As with FIG. 6, time is treated as a parameter such that each time attenuation curve may be considered a "snapshot" of the frequency attenuation of the earth. The T=2.0 curve shows the least attenuation of the earth (the maximum point A4) to occur at about 16 Hz. The 48 dB effective dynamic range of the A/D converter/digital processing system results in an "effective system bandwidth" of about 74 Hz at point $P_3$.

By inserting the attenuation limited low-cut filter circuit 35 of FIG. 7C, the combined earth and sensor attenuation and attenuation limited low-cut filter (assuming for illustration purposes that the spectral boost circuit 30 is not present) results in an attenuation curve 500. The point of maximum signal strength occurs at the point A7 at about 8 Hz. The frequency at which the combined curve 500 falls to 48 dB below point A7 is point P4 at about 98 Hz. For the T=2 second snapshot, the resulting increase in effective system bandwidth is about 24 Hz. The increase in effective system bandwidth at earlier snapshots is greater; for later in time snapshots (i.e., T=3.0 sec.), the increase in effective system bandwidth is reduced slightly due to the attenuation at low frequencies.

In operation, a seismic exploration specialist controls the shape of curve 500 by adjusting the attenuation and cut-off frequencies of circuits 100 of circuit 35 (FIG. 7C) by applying digital control voltages to leads 21–28 effectively controlling the switches S20–S60, S20'–S60', S80, S90 and S100.

Impulse sources have an excess of low frequencies due to both the spectra of the source generated energy and the earth attenuation as described above. The specialist determines the frequency of the spectral peak by examining an FFT (fast fourier transform) plot of a test shot. The attenuation limited low-cut filter parameters are then set to provide the greatest attenuation portion (i.e., $A_{max}$ of FIG. 7B) at approximately the peak of the test spectra. The frequency $f_c$ of the attenuation limited low-cut filter is then set according to the relationship:

$f_c$ = frequency of test spectral peak *K where K is defined as above with reference to Table VI. The attenuation limit (A in dB) is selected depending on the depth of the formation that is desired to be mapped with increased resolution. The low frequency loss at the attenuation limit reduces the maximum depth from which low frequency reflections can be obtained. The highest attenuation produces the greatest increase in bandwidth and the best shallow depth resolution, but deep low frequency reflections are attenuated.

Vibrated sources (such as Vibroseis equipment) convert a majority of their energy into surface waves which propagate at low velocity along the surface of the earth and interfere with the reflections that are arriving from the buried layers of interest. These horizontally traveling waves are usually controlled by the combination of source arrays (multiple vibrators in a line) and receiver arrays which tend to reject horizontally traveling waves. These long arrays tend to "smear" the reflections due to elevation differences within the array and due to reflections that arrive at an angle. This smearing acts as a high frequency filter. If the array is reduced, the interfering surface waves use a large portion of the dynamic recording range.

The attenuation limited low-cut filter of the invention can be used to reduce the amplitude of the surface wave. The surface wave problem is best analyzed with a noise analysis which determines the apparent arrival velocity and time of arrival of the interference. Careful examination of the period of these waves gives a rough approximation of the spectral peak. A more accurate spectral peak determination method is to make an FFT analysis over the arrival time and offset of the interference of interest. Once the spectral peak is determined the choice of filters is the same as described for the impulse source.

Of course both the spectral shaping filter of circuit 30 and the attenuation limited low-cut filters 100 of circuit 35 may have their parameters set, as described above, to enhance the earth-acquisition system bandwidth so as to increase the effective system bandwidth for higher resolution of zones of buried layers in the earth.

Various modifications and alterations in the described system and method will be apparent to those skilled in the art of the foregoing description which does not depart from the spirit of the invention. For this reason, these changes are desired to be included in the appended claims. The appended claims recite the only limitations to the present invention. The descriptive manner which is employed for setting forth the embodiments is to be interpreted as illustrative and not limitative.

What is claimed is:

1. An improved geophysical data acquisition system with at least one channel for recording signals proportional to earth variations having an improvement comprising
    a first spectral shaping circuit in said channel characterized by a first gain at low frequencies, a second gain at high frequencies, and a rising gain between a low cut-off frequency $f_1$ and a higher cut-off frequency $f_2$, and
    a second spectral shaping circuit in said channel having an attenuation versus frequency response characterized by a cut-off frequency $f_c$ and limited attenuation at low frequencies approaching zero frequency.

2. The improved system of claim 1
    wherein said first spectral shaping circuit is disposed in the input stage of said system, and
    said second spectral shaping circuit is a low-cut filter wherein said frequency response has a substantially constant attenuation at low frequencies, a rising attenuation with frequency beyond a lower fixed frequency, and a substantially constant attenuation at frequencies above said cut-off frequency $f_c$.

3. The improved system of claim 2
    wherein said low-cut filter includes
    means for setting, under operator control, the level of said limited attenuation and said cut-off frequency, and wherein said input stage includes
    means for setting, under operator control, the frequency of said lower cut-off frequency and the amount of rising gain between said frequencies $f_1$ and $f_2$.

4. The improved system of claim 1 wherein said second spectral shaping filter is a second-order low-cut filter, and wherein said input stage includes
    first and second differential input amplifiers, each of said differential amplifiers having one of its two inputs connected to one of two input leads conducting said electrical signals, each of said input amplifiers having an output lead,
    an amplifier having two input terminals each connected respectively to one of said output leads of said differential input amplifiers, said operational amplifier having an output lead, and a frequency sensitive network connected between said output lead of said amplifier and respectively to the other of the two inputs of said differential input amplifier.

5. An improved geophysical data acquisition system with at least one channel for recording signals proportional to earth vibrations having an improvement comprising first circuit means in said channel for amplifying said signals with a first gain at low frequencies, amplifying said signals with a second gain at high frequencies, and for amplifying said signals with a rising gain with frequency between a lower cut-off frequency $f_1$ and a higher cut-off frequency $f_2$, and second circuit means in said channel for attenuating said signals with a substantially constant first level of attenuation at low frequencies, for providing a second level of attenuation for said signals at frequencies above a cut-off frequency $f_c$, and for providing a rising attenuation with frequency beyond a lower fixed frequency.

6. A method of spectral shaping in a geophysical data acquisition system having a geophysical data acquisition system having at least one channel for recording signals proportional to earth vibrations comprising amplifying said signals with a first gain at low frequencies, amplifying said signals with a second gain at high frequencies, and amplifying said signals with a rising gain with frequency between a lower cut-off frequency and a higher cut-off frequency, whereby the effective bandwidth of said system is enhanced.

7. A method of spectral shaping in a geophysical data acquisition system having at least one channel for recording signals proportional to earth vibrations comprising, attenuating said signals with substantially constant attenuation at low frequencies, and providing a rising attenuation with frequency above a lower fixed frequency, whereby the effective bandwidth of said system is enhanced.

8. The method of claim 7 further comprising the step of terminating said rising attenuation at frequencies above a cut-off frequency $f_c$.

9. A method of using an improved geophysical data acquisition system with at least one data channel for recording electrical signals proportional to earth vibrations, said system having a spectral shaping circuit in said channel characterized by an operator selectable first gain at low frequencies, an operator selectable lower cut-off frequency $f_1$ and an operator selectable boost gain, the method comprising the steps of, recording electrical signals proportional to earth vibrations from a test recording, determining from the spectrum of attenuation versus frequency of said signals the approximate frequency of the peak amplitude of such signals, setting the lower cut-off frequency $f_1$ of said input stage to be substantially the same as the frequency of said peak amplitude, and setting the amount of boost gain at a level to enhance an effective system bandwidth characteristic.

10. A method of using an improved geophysical data acquisition system with at least one data channel for recording electrical signals proportional to earth vibrations, said system having a low-cut filter in said channel having an attenuation versus frequency response characterized by an operator selectable cut-off frequency $f_c$ and an operator selectable limited attenuation level at low frequencies approaching zero frequency and by a region of maximum attenuation level below said cut-off frequency, said maximum attenuation being greater than or equal to said limited attenuation, the method comprising the steps of, recording electrical signals proportional to earth vibrations from a test recording with the boost gain of the system set to zero, determining from the spectrum of attenuation versus frequency of said signals the frequency of the peak amplitude of such signals, setting the frequency of maximum attenuation of said low-cut filter at approximately the frequency of the peak of the spectra determined from said test recording, and, setting a level of limited attenuation of said attenuator limited low-cut filter to enhance an effective system bandwidth characteristic.

11. In a geophysical data acquisition system with at least one data channel for recording signals proportional to earth vibrations, an improved input stage comprising amplifier means for accepting a differential geophysical signal proportional to earth vibrations, for accepting a feedback signal, and for producing a single ended output signal on an output lead, and frequency responsive circuit means responsive to said output signal on said output lead for producing a frequency filtered feedback signal to said amplifier means, whereby the amplitude versus frequency response of said input stage is characterized by a substantially constant response at low frequencies, a rising response at frequencies higher than a first cut-off frequency, $f_1$, and a substantially constant response at frequencies higher than a second cut-off frequency, $f_2$, where said second cut-off frequency $f_2$ is greater than said first cut-off frequency $f_1$.

12. The input stage of claim 11 further comprising means for setting, under operator control, the frequency of said first cut-off frequency and the amount of gain between said second cut-off frequency and said first cut-off frequency.

13. In combination with a geophysical data acquisition system channel, including an input stage responsive to seismic signals and a recorder for storing representations of said signals, an attenuated limited low-cut filter disposed between said input stage and said recorder, said attenuated limited low-cut filter comprising, first means for producing a cut-off frequency $f_c$ such that signals of frequency below $f_c$ are increasingly attenuated with decreases in frequency below said cut-off frequency $f_c$, and second means for limiting attenuation of such signals at low frequencies approaching zero frequency, whereby said attenuation limited low-cut filter has an input-output response characterized by a cut-off frequency $f_c$ and limited attenuation at low frequencies approaching zero frequency.

14. The combination of claim 13 wherein said first and second means of said attenuation limited low-cut filter cooperate to produce said input-output response having a region of maximum attenuation below said cut-off frequency, said maximum attenuation being greater than or equal to said limited attenuation.

15. The combination of claim 13 wherein said attenuated limited low-cut filter includes
means for setting, under operator control, the level of said limited attenuation and said cut-off frequency.

16. The combination of claim 13 wherein said attenuated limited low-cut filter is a second-order low-cut filter.

17. In a data channel of a geophysical data acquisition system for acquiring and recording a seismic signal representative of earth vibrations, a boosting circuit comprising,
means for providing a first gain for seismic signals of low frequencies below a lower cut-off frequency $f_1$,
means for providing a second gain for seismic signals of high frequencies above a higher cut-off frequency $f_2$, and
means for providing a rising gain for seismic signals of frequencies between said lower cut-off frequency and said higher cut-off frequency.

18. The boosting circuit of claim 17 further comprising,
means for setting, under operator control, the frequency of said lower cut-off frequency and the amount of rising gain between said lower cut-off frequency $f_1$ and said upper cut-off frequency $f_2$.

19. An improved geophysical data acquisition system with at least one data channel for recording electrical signals proportional to earth vibrations, having an improvement comprising,
a differential amplifier means with differential inputs for accepting geophysical signals across two input leads and for generating single ended amplified intermediate signals proportional to the signals applied between said input leads, and
an amplifier means having said amplified intermediate signals applied to one of its input terminals, said amplifier having a portion of its output applied via a frequency sensitive network to another of its input terminals, for producing output signals,
whereby said output signal relative to said signals applied across said two input leads are characterized by a first gain at low frequencies, a second gain at high frequencies, and a rising gain between a lower cut-off frequency $f_1$ and a higher cut-off frequency $f_2$.

20. An improved geophysical data acquisition system with at least one data channel for recording an electrical signal representative of earth vibrations, having an improvement comprising,
first and second differential amplifiers, each of said differential amplifiers having one of its two inputs connected to one of two input leads conducting said electrical signal, each of said amplifiers having an output lead,
an amplifier having two input terminals each connected respectively to one of said output leads of said differential amplifiers, said amplifier having an output lead, and
a frequency sensitive network connected between said output lead of said amplifier and respective to the other of the inputs of said differential amplifier,
wherein the relationship of a signal on said output lead of said amplifier as compared to said electrical signal across said two input leads is characterized by a first gain at low frequencies, a second gain at high frequencies, and a rising gain between a lower cut-off frequency $f_1$ and a higher cut-off frequency $f_2$.

* * * * *